(12) United States Patent
O'Grady

(10) Patent No.: US 12,377,753 B2
(45) Date of Patent: Aug. 5, 2025

(54) METHODS AND SYSTEMS FOR DISPLAYING RANGE AND REMAINING ENERGY TO DRIVER

(71) Applicant: Rivian IP Holdings, LLC, Irvine, CA (US)

(72) Inventor: Jack Thomas O'Grady, Venice, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 422 days.

(21) Appl. No.: 17/690,915

(22) Filed: Mar. 9, 2022

(65) Prior Publication Data

US 2023/0286413 A1   Sep. 14, 2023

(51) Int. Cl.
| | |
|---|---|
| *B60L 58/13* | (2019.01) |
| *B60W 40/09* | (2012.01) |
| *B60W 50/14* | (2020.01) |
| *G01C 21/34* | (2006.01) |

(52) U.S. Cl.
CPC ............. *B60L 58/13* (2019.02); *B60W 40/09* (2013.01); *B60W 50/14* (2013.01); *G01C 21/3469* (2013.01); *B60W 2050/146* (2013.01)

(58) Field of Classification Search
CPC .. B60L 58/13; B60L 2250/16; B60L 2250/18; B60L 2260/52; B60L 58/12; B60L 3/12; B60W 40/09; B60W 50/14; B60W 2050/146; B60W 50/0097; B60W 2530/10; B60W 2530/13; B60W 2530/203; G01C 21/3469; Y02T 10/70; B60K 37/00; B60R 16/02
See application file for complete search history.

(56) References Cited

U.S. PATENT DOCUMENTS

| | | | |
|---|---|---|---|
| 2012/0179319 A1* | 7/2012 | Gilman | B60W 50/0097 340/455 |
| 2023/0141525 A1* | 5/2023 | Eitzer | H01M 10/482 320/109 |

\* cited by examiner

*Primary Examiner* — Yuen Wong
(74) *Attorney, Agent, or Firm* — Haley Guiliano LLP

(57) ABSTRACT

Method and systems for displaying vehicle range and remaining energy to a driver is disclosed that includes a nominal range, based on a battery state of charge, and a dynamic range, based on the battery state of charge and a vehicle characteristic. The range indicator may be a linear battery icon that presents the nominal range as a first display element and the dynamic range as a second display element. The first display element may comprise a first bar length of a faded color and the second display element may comprise a second bar length of a full color.

19 Claims, 5 Drawing Sheets

METHODS AND SYSTEMS FOR DISPLAYING RANGE AND REMAINING ENERGY TO DRIVER

INTRODUCTION

The present disclosure relates to a range indicator for electric vehicles that displays two range elements in a battery icon. In particular, the present disclosure relates to a range indicator that includes a nominal range, which is based on a battery state of charge, and a dynamic range, which is based on the battery state of charge and a vehicle characteristic, within a linear battery icon.

SUMMARY

Drivers of electric vehicles depend on range indicators to determine the amount of mileage left in their car before needing to recharge. For example, a driver may read a range indicator on their vehicle's dashboard and see they have 215 miles till their battery runs out. The 215 miles the driver sees may be a nominal, or normal, value, where under ideal conditions (e.g., a flat route, an ideal drive height, no load on the vehicle, normal tires, an ideal outside temperature, good driving efficiency, etc.) the range indicator reads true and the vehicle has a range of 215 miles. Electric vehicles may include a dynamic, or estimated, value, where certain vehicle characteristics (e.g., range factors) are taken into consideration that affect the vehicle's range. For example, in accordance with the present disclosure, a driver may switch drive modes of a vehicle from, for example, conserve mode to off road mode, in which case the vehicle's range indicator may decrease from a nominal range value of 215 miles to a dynamic range value of 115 miles due to off road mode requiring the vehicle to adjust drive height and consider an unpaved, rocky route ahead. In some embodiments, a driver's behavior may change so that a vehicle travels at high speeds, with high accelerations, and with limited regeneration, in which case the vehicle's range indicator may decrease from a nominal range value of 215 miles to a dynamic range value of 172 miles due to a poor driving efficiency. In some embodiments, a driver's route may include a significant increase in elevation, in which case the vehicle's range indicator may decrease from a nominal range value of 215 miles to a dynamic range value of 142 miles due to the uphill nature of the drive. Dynamic range values in electric vehicles can be unclear and appear disconnected from nominal range values, which can be confusing for drivers since dynamic range values may fluctuate as vehicle characteristics (e.g., driving behavior, drive modes, route features, vehicle configurations, etc.) change in real time. For the same level of charge, dynamic range values can jump instantaneously between numbers and appear to be much less than nominal range values, so complex electric vehicles need a better way to convey usable range compared to nominal range.

Systems and methods are described herein for a range indicator that includes both a nominal range, based on a battery state of charge, and a dynamic range, based on the battery state of charge and a vehicle characteristic, within one linear battery icon. In some embodiments, the nominal range and the dynamic range of a vehicle may respectively be any suitable value. It will be understood that "range indicator" may be referred to as "dynamic range indicator" throughout the present disclosure. The range indicator includes a linear battery icon and a range number, which corresponds to the dynamic range of the vehicle. In some embodiments, the range indicator may couple to or be controlled by processing circuitry (e.g., control circuitry) to receive and/or run instructions. It will be understood that there may be any suitable number of range indicators presented in the range indicator display. The range indicator includes a first display element that indicates the nominal range of the vehicle and a second display element that indicates the dynamic range of the vehicle. In some embodiments, the first display element is a first bar length and the second display element is a second bar length. The first bar length, corresponding to the nominal range, is a faded color and the second bar length, corresponding to the dynamic range, is a full color. In some embodiments, the range indicator may include more than two display elements which indicate more than two ranges a vehicle may be capable of travelling based on battery state of charge and vehicle characteristics. In some embodiments, the second bar length, corresponding to the dynamic range, may exceed the first bar length, corresponding to the nominal range. For example, a route with a decrease in elevation may show a nominal range, indicated by the first bar length of the faded color, of 40 miles and a dynamic range, indicated by the second bar length of the full color, of 60 or more miles.

In some embodiments, control circuitry, coupled to the range indicator display, may determine a particular vehicle characteristic(s) (e.g., range factor) that causes the dynamic range to be different than the nominal range and may generate for display information indicating the particular vehicle characteristic(s) and its impact on the dynamic range. For example, control circuitry, coupled to the range indicator display, may determine that battery state of charge, drive mode, route features, and vehicle configuration (e.g., tires, permanent body adjustments, racks, etc.) respectively contribute to the difference between the dynamic range and the nominal range. This difference may be indicated by levels and widths of shading/opacity within the range indicator. In some embodiments, certain vehicle characteristics (e.g., heating, ventilation, and air conditioning (HVAC) usage, ride height, drive mode, driving behavior, route features, and window state), which contribute to the difference between the dynamic range and the nominal range, may be recoverable (e.g., a driver can recapture lost vehicle range), while other vehicle characteristics (e.g., vehicle configuration), which also contribute to the difference between the dynamic range and the nominal range, may be un-recoverable (e.g., the driver cannot recapture the lost vehicle range). It will be understood that "battery state of charge" may either be referred to as "battery state of energy" or "battery state of health" in the present disclosure. In some embodiments, the control circuitry may receive a selection via a user input interface, in which case the control circuitry may generate for display, in response to the selection, an exploded version of the range indicator with visual information indicating a vehicle characteristic(s) (e.g., range factor) and its impact on the dynamic range. In some embodiments, the control circuitry may generate for display a recommendation to increase the dynamic range of the vehicle. For example, the control circuitry may recommend reducing HVAC usage to preserve the vehicle's battery and extend the vehicle's range if the outside temperature is moderate. In some embodiments, the control circuitry may jointly utilize machine learning and sensors attached to the vehicle to determine the vehicle's configuration and its impact on the dynamic range. For example, sensors (e.g., a camera) may detect a trailer hitched to the back of the vehicle, and in conjunction with machine learning, adjust the vehicle's dynamic range accordingly. In some embodiments, the vehicle may communicate the dynamic range with a mobile device. For example, the vehicle may detect low tire pressure and, accordingly, reduce the vehicle's dynamic range, which is reflected in the range indicator. In this instance, the vehicle may communicate to a driver's mobile device that low tire pressure has reduced the vehicle's dynamic range and recommend filling the tires up with air.

BRIEF DESCRIPTION OF DRAWINGS

The above and other features of the present disclosure, its nature, and various advantages will be more apparent upon consideration of the following detailed description, taken in conjunction with the accompanying drawings in which.

DETAILED DESCRIPTION

In some embodiments, the present disclosure relates to a range indicator that includes both a nominal range, based (e.g., solely) on a battery state of charge, and a dynamic range, based on the battery state of charge and a vehicle characteristic, within one linear battery icon. In some embodiments, the nominal range and the dynamic range of a vehicle may respectively be any suitable value. It will be understood that "range indicator" may be referred to as "dynamic range indicator" throughout the present disclosure. The range indicator includes a linear battery icon and a range number, which corresponds to the dynamic range of the vehicle. In some embodiments, the range indicator may couple to or be controlled by processing circuitry (e.g., control circuitry) to receive and/or run instructions. It will be understood that there may be any suitable number of range indicators presented in the range indicator display. The range indicator includes a first display element that indicates the nominal range of the vehicle and a second display element that indicates the dynamic range of the vehicle. In some embodiments, the first display element is a first bar length and the second display element is a second bar length. The first bar length, corresponding to the nominal range, is a faded color and the second bar length, corresponding to the dynamic range, is a full color. In some embodiments, the range indicator may include more than two display elements which indicate more than two ranges a vehicle may be capable of travelling based on vehicle characteristics. In some embodiments, the second bar length, corresponding to the dynamic range, may exceed the first bar length, corresponding to the nominal range. For example, a route with a decrease in elevation may show a nominal range, indicated by the first bar length of the faded color, of 40 miles and a dynamic range, indicated by the second bar length of the full color, of 60 or more miles.

Figure 1A:
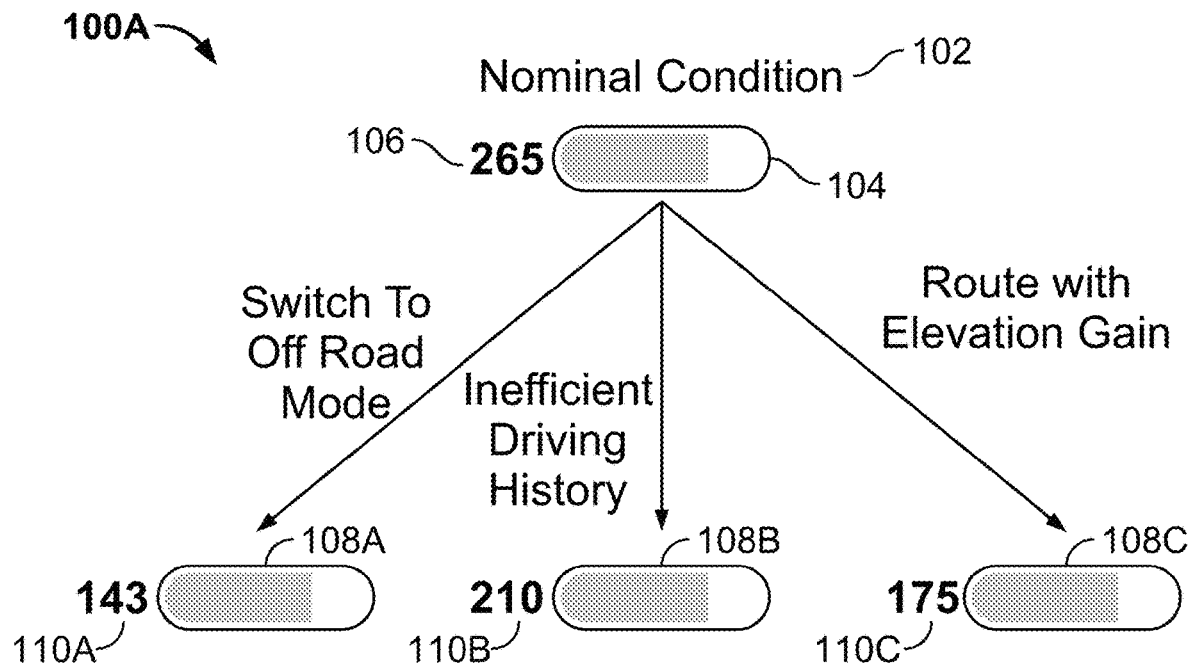
FIG. 1A shows an illustrative range indicator display 100A including one display element, in accordance with an embodiment of the present disclosure.
Figure 1B:
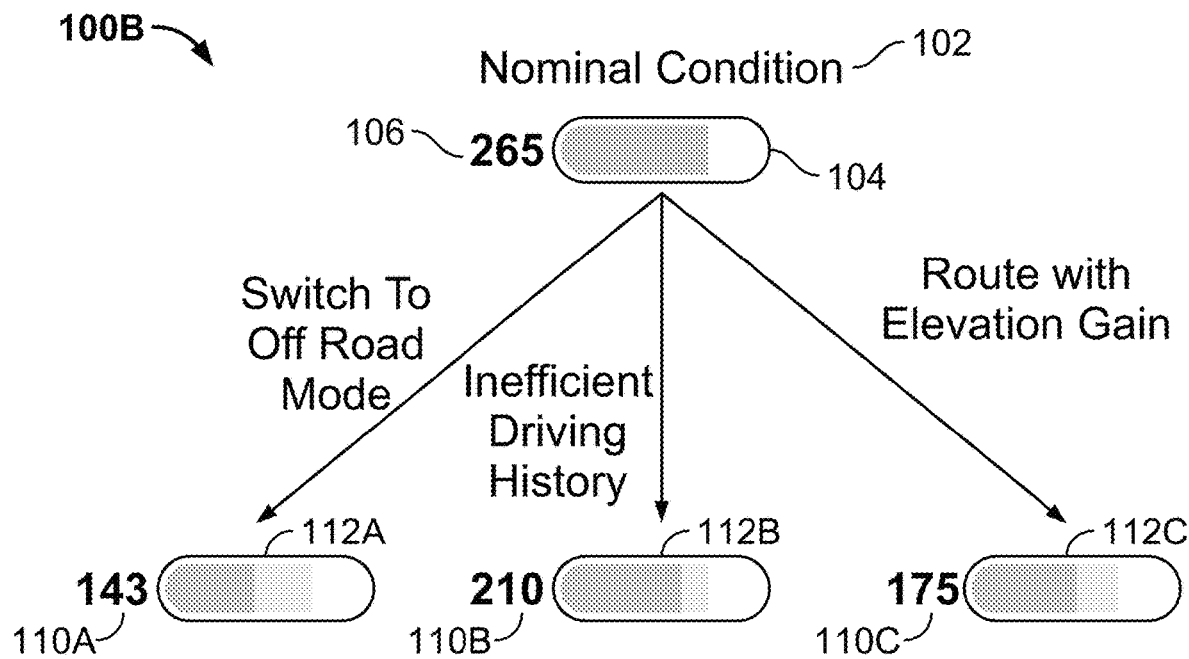
FIG. 1B shows an illustrative range indicator display 100B including two display elements, in accordance with an embodiment of the present disclosure.

FIG. 1A shows an illustrative range indicator display 100A including one display element, in accordance with an embodiment of the present disclosure, while FIG. 1B shows an illustrative range indicator display 100B including two display elements, in accordance with an embodiment of the present disclosure. FIG. 1A includes nominal condition 102, nominal range indicator 104, nominal range value 106, dynamic range indicators 108A, 108B, 108C and dynamic range values 110A, 110B, 110C. Although range indicator display 100A depicts three vehicle characteristics (e.g., switch to off road mode, inefficient driving history, and route with elevation gain), it will be understood that range indicator display 100A may take into account any suitable number of vehicle characteristics and, accordingly, include any suitable number of dynamic range indicators 108A, 108B, 108C. In some embodiments, nominal range value 106 and dynamic range values 110A, 110B, 100C may respectively be any suitable values. In some embodiments, range indicator display 100A is coupled to processing circuitry (e.g., control circuitry) to receive and/or run instructions. FIG. 1B includes nominal condition 102, nominal range indicator 104, nominal range value 106, and dynamic range values 110A, 110B, 110C of FIG. 1A. In addition, range indicator display 100B includes dynamic range indicators 112A, 112B, 112C, which respectively include a first display element (e.g., a nominal range) and a second display element (e.g., a dynamic range). Although range indicator display 100B depicts three vehicle characteristics (e.g., switch to off road mode, inefficient driving history, and route with elevation gain), it will be understood that range indicator display 100B may take into account any suitable number of vehicle characteristics and, accordingly, include any suitable number of dynamic range indicators 112A, 112B, 112C. In some embodiments, range indicator display 100B is coupled to processing circuitry (e.g., control circuitry) to receive and/or run instructions. The range indicator display 100A and 100B may be displayed as a graphical element on a central information display of the vehicle, a driver instrument panel of the vehicle, and/or a mobile application executing on a device associated with the driver and provided by a server associated with the vehicle manufacturer.

In some embodiments, nominal condition 102 represents a vehicle state where ideal travel conditions are met to maximize vehicle range, which is reflected by nominal range indicator 104 and nominal range value 106. Nominal condition 102 may reflect a flat route, normal tires, optimal ride height, nominal outside temperature, a rolling average of driving efficiency over a time period (e.g., a miles-per-energy notation), etc., and nominal range indicator 104 does not change with drive modes (e.g., conserve mode, off road mode, or sport mode), vehicle configurations (e.g., type of tires or any suitable load on the vehicle), route features, or driving behavior (e.g., driving characteristics or efficiency). For example, a GPS navigation system may estimate a change in route elevation towards a vehicle's destination, but the nominal range indicator 104 may not convey to a driver that the vehicle will either have more or less battery life due to changes in route elevation. In some embodiments, a vehicle may tow a loaded fishing boat trailer that weighs 2,700 pounds, and the nominal range indicator 104 may not consider this load in displaying the vehicle's nominal range in the battery icon. In addition, rated driving efficiency over an earlier time period may not be useful in predicting the efficiency of the route ahead of the vehicle. Nominal range indicator 104 and nominal range value 106 are both determined by the vehicle's battery state of charge (SOC). For example, based on a vehicle's battery state of charge, nominal range value 106 may show a vehicle has a range of 265 miles, and nominal range indicator 104 may reflect this mileage with a linear battery icon filled up three fourths of the way. It will be understood that nominal range value 106 may be any suitable value.

Dynamic range values 110A, 110B, 110C are determined by the vehicle's battery state of charge and vehicle characteristic(s), but dynamic range indicators 108A, 108B, 108C continue to display the same battery life as nominal range indicator 104. It will be understood that the dynamic range values 110A, 110B, 110C of the vehicle may respectively be any suitable values. In some embodiments, vehicle characteristics may include drive mode, drive height, driving efficiency (e.g., driving behavior or characteristics), route features (e.g., changes in elevation or speed), vehicle configuration (e.g., type of tires, any suitable load on the vehicle, permanent body adjustments, etc.), and HVAC (heating, ventilation, and air conditioning)/climate controls. In some embodiments, vehicle characteristics may include any suitable vehicle characteristic (e.g., range factor) or external variable that may affect the vehicle's dynamic range. For example, a cold overnight condition may affect the vehicle's battery state of charge by reducing the temperature of the battery and, accordingly, reducing the vehicle's dynamic range, which may be reflected in dynamic range values 110A, 110B, 110C. Concurrently, dynamic range indicators 108A, 108B, 108C may display the same battery life as nominal range indicator 104 and fail to adjust to an accurate battery level. In some embodiments, switching the drive mode of a vehicle to off road mode may reduce the vehicle's range from a nominal range value 106 of, e.g., 265 miles to a dynamic range value 110A of, e.g., 143 miles because off road mode may require all-wheel drive and a higher drive height. However, dynamic range indicator 108A may display the same battery life as nominal range indicator 104, which would be confusing for the driver to see that the same state of charge can, depending on the vehicle characteristic, result in discrepant range values. In some embodiments, inefficient driving (e.g., including high speeds, high accelerations, and limited regeneration) may reduce the vehicle's range from a nominal range value 106 of, e.g., 265 miles to a dynamic range value 110B of, e.g., 210 miles. In some embodiments, a route with elevation gain or decreased speed may reduce the vehicle's range from a nominal range value 106 of, e.g., 265 miles to a dynamic range value 110C of, e.g., 175 miles. In each of these instances, dynamic range indicators 108A, 108B, 108C may display the same battery life as nominal range indicator 104, but the respective dynamic range values 110A, 110B, 110C may appear unclear and disconnected from nominal range value 106 due to significant differences in range, which may be confusing for drivers and provoke an unenjoyable driving experience.

In range indicator display 100B, dynamic range indicators 112A, 112B, 112C respectively include a first display element, which indicates the vehicle's nominal range, and a second display element, which indicates the vehicle's dynamic range, where the first display element is a first bar length and the second display element is a second bar length. This two-element configuration clearly conveys that the dynamic range value correlates with the second display element (e.g., the dynamic range), while the nominal range value correlates with the first display element (e.g., the nominal range) within the dynamic range indicator, which visually and accurately displays the effect a vehicle characteristic has on the difference between the two ranges. In some embodiments, the range indicator display may show only one range indicator and value at a time. It will be understood that the range indicator display may change over time as the state of charge of the vehicle decreases and the vehicle characteristics change. In some embodiments, the first bar length, corresponding to the nominal range, is a faded color and the second bar length, corresponding to the dynamic range, is a full color. For example, a vehicle may have a rack with camping equipment attached to its roof, which may reduce the vehicle's range from a nominal range value 106 of, e.g., 265 miles to a dynamic range value 110A of, e.g., 200 miles. Dynamic range indicator 112A may reflect this with a first bar length of a faded color, corresponding to the vehicle's nominal range, extending three fourths the length of the battery icon and a second bar length of a full color, corresponding to the vehicle's dynamic range, extending half the length of the battery icon. In some embodiments, the second bar length may exceed the first bar length. For example, a route with a decrease in elevation may result in a nominal range value 106, indicated by the first bar length of the faded color, of 40 miles and a dynamic range value 110A, indicated by the second bar length of the full color, of 60 or more miles. In some embodiments, dynamic range indicators 112A, 112B, 112C may include more than two display elements, which may indicate more than two ranges a vehicle is capable of travelling based on battery state of charge and vehicle characteristic(s).

Figure 2:
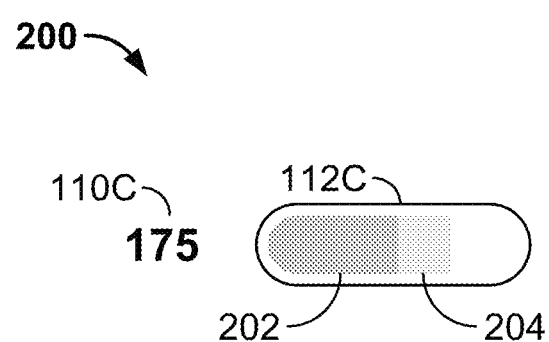
FIG. 2 shows an illustrative linear battery icon 200, including two display elements and a range number, in accordance with an embodiment of the present disclosure.

FIG. 2 shows an illustrative linear battery icon 200, including two display elements and a range number, in accordance with an embodiment of the present disclosure. FIG. 2 includes dynamic range indicator 112C and dynamic range value 110C of FIG. 1B. In some embodiments, dynamic rage indicator 112C may display any suitable level(s) of battery life in a vehicle based on battery state of charge and vehicle characteristic(s). It will be understood that dynamic range value 110C may also be any suitable value. Dynamic range indicator 112C includes a first display element 204 (e.g., representing the vehicle's nominal range) and a second display element 202 (e.g., representing the vehicle's dynamic range). Although FIG. 2 displays dynamic range indicator 112C including two display elements, it will be understood that dynamic range indicator 112C may include more than two display elements, which may indicate more than two ranges a vehicle is capable of travelling based on battery state of charge and vehicle characteristic(s).

Second display element 202 indicates the vehicle's dynamic range, which is determined by the vehicle's battery state of charge and vehicle characteristic(s). In some embodiments, vehicle characteristics may include drive mode, drive height, driving efficiency (e.g., driving behavior or characteristics), route features, vehicle configuration (e.g., type of tires, any suitable load on the vehicle, permanent body adjustments, etc.), and HVAC (heating, ventilation, and air conditioning)/climate controls. In some embodiments, vehicle characteristics may include any suitable vehicle characteristic (e.g., range factor) or external variable that may affect the vehicle's dynamic range. Second display element 202 takes the form of a second bar length of a full color. In some embodiments, the second bar length, corresponding to the vehicle's dynamic range, may exceed the first bar length, corresponding to the vehicle's nominal range. First display element 204 indicates the vehicle's nominal range, which is determined by the vehicle's battery state of charge. First display element 204 reflects nominal condition 102, where ideal driving conditions (e.g., a flat route, normal tires, optimal ride height, normal outside temperature, a rolling average of driving efficiency over a time period (e.g., a miles-per-energy notation), etc.) may be considered to maximize the vehicle's range, and vehicle characteristics such as drive modes, vehicle configurations (e.g., type of tires or any suitable load on the vehicle), route features, or driving behavior are ignored. First display element 204 takes the form of a first bar length of a faded color. Display elements 202 and 204 provide a visual indicator of how the dynamic range differs from the nominal range.

Figure 3:
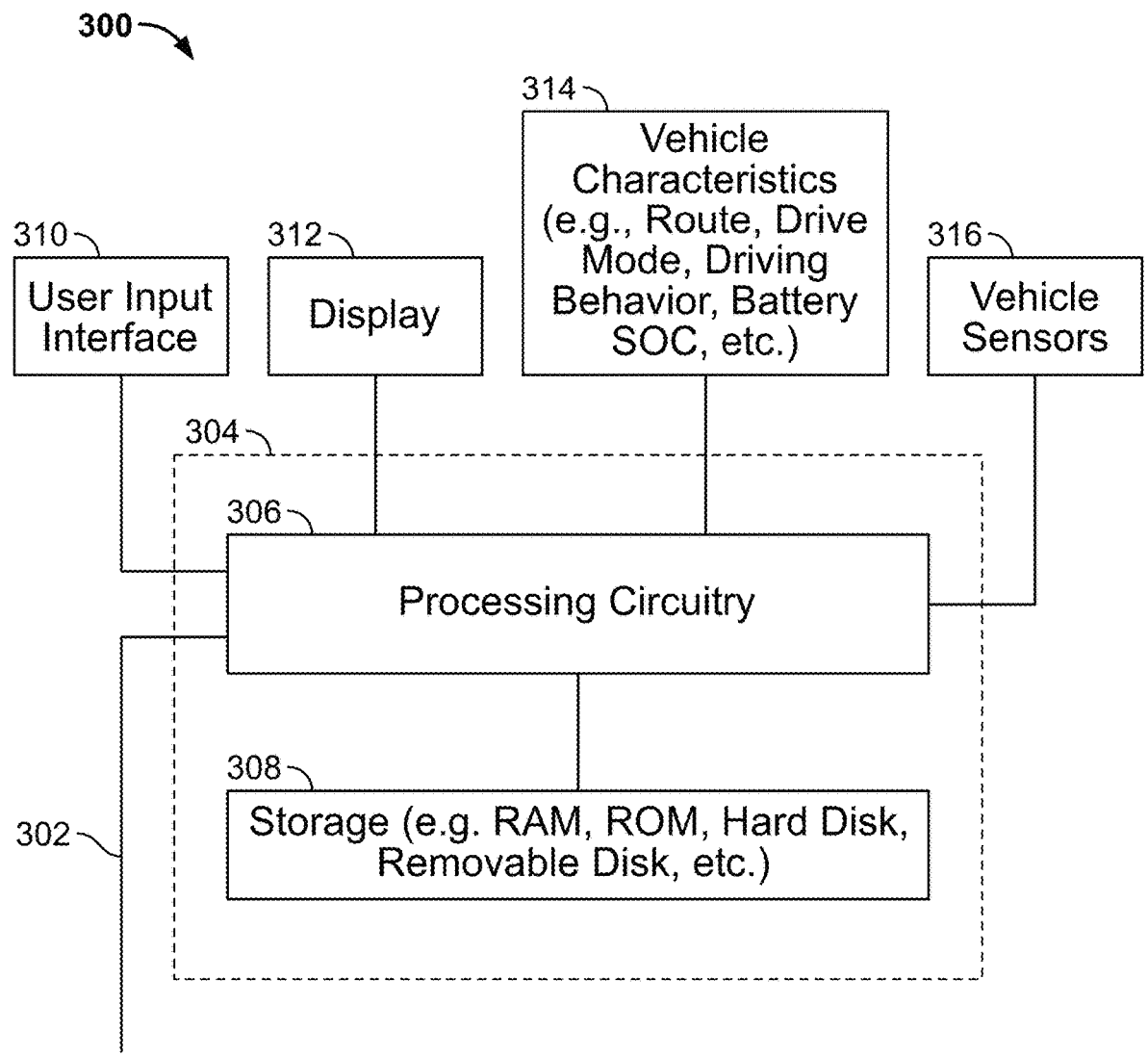
FIG. 3 shows an illustrative depiction of an example vehicle device, in accordance with an embodiment of the present disclosure.

FIG. 3 shows an illustrative depiction of an example vehicle device, in accordance with an embodiment of the present disclosure. Vehicle device 300 may receive content and data via input/output (I/O) path 302. I/O path 302 may provide content (e.g., navigation content) and metadata (e.g., sensor data, battery health data, etc.) to control circuitry 304, which includes processing circuitry 306 and storage 308. Control circuitry 304 may send and receive commands, requests, and other suitable data using I/O path 302. I/O path 302 may connect control circuitry 304 (and specifically processing circuitry 306) to one or more communications paths (described below). One or more of these communications paths may provide the I/O functions but are shown as a single path in FIG. 3 to avoid overcomplicating the drawing.

Any suitable processing circuitry, such as processing circuitry 306, may compose control circuitry 304. In some embodiments, control circuitry 304 executes instructions for data stored in memory (e.g., storage 308). For example, control circuitry 304 may determine at least one particular vehicle characteristic that causes the dynamic range to be different than the nominal range and generate for display information indicating the at least one particular characteristic and its impact on the dynamic range.

In client-server based embodiments, control circuitry 304 may include communications circuitry suitable for communicating with a data server or other networks or servers. The data server may store the instructions for carrying out the above-mentioned functionality. Communications circuitry may include a wireless modem for communications with other equipment (e.g., a satellite, another vehicle, etc.) or any other suitable communications circuitry. Such communications may involve the Internet or any other suitable communications networks or paths. In addition, communications circuitry may include circuitry that enables peer-to-peer communication of vehicle devices, or communication of vehicle devices in locations remote from each other.

Memory may be an electronic storage device provided as storage 308 that is part of control circuitry 304. Storage 308 may store various types of content (e.g., navigation content) described herein as well as metadata (e.g., sensor data, battery health data, etc.) described above. Storage 308 may also use nonvolatile memory (e.g., to launch a boot-up routine and other instructions). Cloud-based storage may either supplement or replace storage 308.

Control circuitry 304 may include video generating circuitry, encoding circuitry (e.g., for delivering vehicle information to a remote server, a satellite, or another vehicle), and decoding circuitry (e.g., for receiving instructions/commands from a remote server or a satellite) in some embodiments described herein. Software running on one or more general purpose or specialized processors may implement the circuitry described herein.

A user may send instructions to control circuitry 304 using user input interface 310. User input interface 310 may be any suitable vehicle user interface, such as a touchscreen, touch button, joystick, voice recognition interface, or any other user input interfaces.

Control circuitry 304 may generate for display a dynamic range indicator (corresponding to dynamic range indicator 112C of FIG. 2) with a corresponding dynamic range value (corresponding to dynamic range value 110C of FIG. 2) on display 312 as a stand-alone device or integrated with other elements of vehicle device 300. For example, display 312 may be a touchscreen or touch-sensitive display. In such circumstances, display 312 may integrate or combine with user input interface 310. Display 312 may be one or more of a monitor, a liquid crystal display (LCD), an amorphous silicon display, a low temperature poly silicon display, an electronic ink display, an electrophoretic display, an active matrix display, an electro-wetting display, an electrofluidic display, a cathode ray tube display, a light-emitting diode display, an electroluminescent display, a plasma display panel, a high-performance addressing display, a thin-film transistor display, an organic light-emitting diode display, a surface-conduction electron-emitter display (SED), a laser television, carbon nanotubes, a quantum dot display, an interferometric modulator display, or any other suitable equipment for displaying visual images.

In some embodiments, display 312 may be a 3D display that presents the content item in 3D. A video card or graphics card may generate the output to the display 312. The video card may offer various functions such as accelerated rendering of 3D scenes and 2D graphics, MPEG5 2/MPEG-4 decoding, TV output, or the ability to connect multiple monitors. The video card may be any processing circuitry described above in relation to control circuitry 304. The video card may integrate with control circuitry 304. Vehicle device 300 may also incorporate or be accessible to one or more vehicle sensors 316 (e.g., cameras, radar, LiDAR, ultrasonic sensors, global navigation satellite sensors, electromechanical sensors, etc.) attached to the vehicle, which may provide vehicle device 300 with data regarding the vehicle's ambient environment. In some embodiments, vehicle device 300 may jointly utilize machine learning and sensors attached to the vehicle to determine the vehicle's configuration and its corresponding impact on the vehicle's dynamic range. For example, sensors (e.g., a camera) may detect a rack with camping equipment attached to the roof of the vehicle, and, in conjunction with machine learning (e.g., based on historical range data and/or battery health data associated with the current driver and one or more other drivers), adjust the vehicle's dynamic range accordingly. In some embodiments, a central server may receive range data, battery health information, vehicle characteristics, and/or driving behavior information from a plurality of vehicles via uploading of vehicle telematic information to the central server associated with the plurality of vehicles.

In some embodiments, vehicle device 300 may receive data generated by a remote server and may display the data locally on vehicle device 300 via display 312. This way, the processing of the instructions is performed remotely by the server while the resulting data is provided locally on vehicle device 300. In some embodiments, the processing of user-selected instructions, received via user input interface 310, may happen locally at vehicle device 300. Vehicle device 300 may receive inputs from a user via user input interface 310 and transmit those inputs and/or corresponding instructions to the remote server for processing and generating the associated data. For example, vehicle device 300 may transmit a communication to the remote server indicating that a destination selection was received via user input interface 310. The remote server may process instructions (e.g., changes in elevation towards the destination) in accordance with the input and generate or retrieve route information (e.g., a vehicle characteristic) corresponding to the input to generate, for example, an appropriate dynamic range. The generated dynamic range is then transmitted to vehicle device 300 for presentation to the user via display 312.

Figure 4:
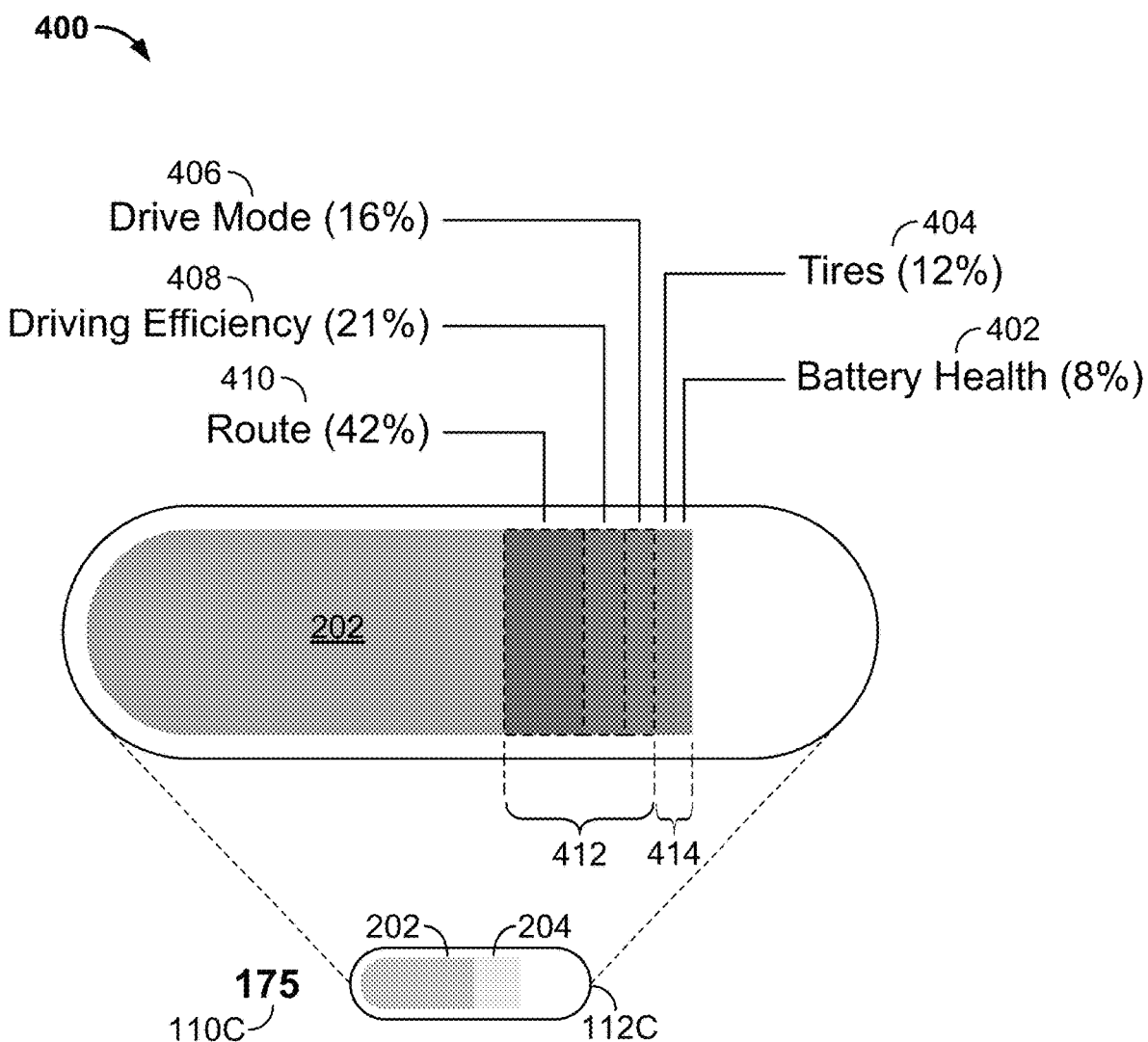
FIG. 4 shows an exploded, illustrative linear battery icon 400 with vehicle characteristics, in accordance with an embodiment of the present disclosure.

FIG. 4 shows an exploded, illustrative linear battery icon 400 with vehicle characteristics, in accordance with an embodiment of the present disclosure. FIG. 4 includes dynamic range indicator 112C and dynamic range value 110C of FIG. 1B as well as first display element 204 and second display element 202 of FIG. 2. Although dynamic range value 110C displays a range of 175 miles, it will be understood that the dynamic range value 110C may be any suitable value. FIG. 4 includes vehicle characteristics (e.g., battery health (8%) 402, tires (12%) 404, drive mode (16%) 406, driving efficiency (21%) 408, and route (42%) 410), recoverable range 412, and unrecoverable range 414. Although FIG. 4 includes particular vehicle characteristics, it will be understood that any suitable vehicle characteristics that affect range may be included or taken into account. In some embodiments, the exploded, linear battery icon depicted in system 400 may show the second display element 202 at any suitable level of battery life.

In some embodiments, control circuitry 304 may determine one or more vehicle characteristic(s) (e.g., drive mode, drive height, driving efficiency (e.g., driving behavior or characteristics), route features, vehicle configuration (e.g., type of tires, any suitable load on the vehicle, permanent body adjustments, etc.), and HVAC (heating, ventilation, and air conditioning)/climate controls) that causes the dynamic range to be different than the nominal range and may generate for display information indicating the vehicle characteristic(s) and their impact on the dynamic range. For example, as conveyed by FIG. 4, control circuitry 304 may determine that battery health (8%) 402, tires (12%) 404, drive mode (16%) 406, driving efficiency (21%) 408, and route (42%) 410 respectively contribute to the difference between the dynamic range, corresponding to the second display element 202 in a full color, and the nominal range, corresponding to the first display element 204 in a faded color, as indicated by levels and widths of shading/opacity within dynamic range indicator 112C. In some embodiments, certain vehicle characteristics (e.g., drive mode (16%) 406, driving efficiency (21%) 408, and route (42%) 410), which contribute to the difference between the dynamic range and the nominal range, may contribute to recoverable range 412 (e.g., a driver can make changes to recapture lost vehicle range, as indicated by dashed lines within the gap between the dynamic and nominal range), while other vehicle characteristics (e.g., battery health (8%) 402 and tires (12%) 404), which also contribute to the difference between the dynamic range and the nominal range, may contribute to unrecoverable range 414 (e.g., the driver cannot make changes to recapture lost vehicle range).

In some embodiments, dynamic range indicator 112C may receive a selection via user input interface 310, in which case control circuitry 304 may generate for display, in response to the selection, the exploded version of dynamic range indicator 112C with visual information indicating a particular vehicle characteristic(s) and its impact on the dynamic range. In some embodiments, control circuitry 304 may generate a recommendation to increase the vehicle's dynamic range. For example, control circuitry 304 may recommend switching the drive mode of a vehicle from off road mode to conserve mode if control circuitry 304 detects the vehicle has travelled on a paved road for a threshold period of time in order to preserve the vehicle's dynamic range. In some embodiments, control circuitry 304 may communicate the vehicle's dynamic range to a mobile device (e.g., a smartphone, a tablet, a laptop, or any suitable IoT device). For example, a cold overnight condition may affect the vehicle's battery state of charge by reducing the temperature of the battery and, accordingly, reducing the vehicle's dynamic range, which would be reflected in dynamic range indicator 112C. In this instance, control circuitry 304 may communicate to a driver's mobile device that cold weather has reduced the vehicle's dynamic range and may recommend charging the vehicle.

Figure 5:
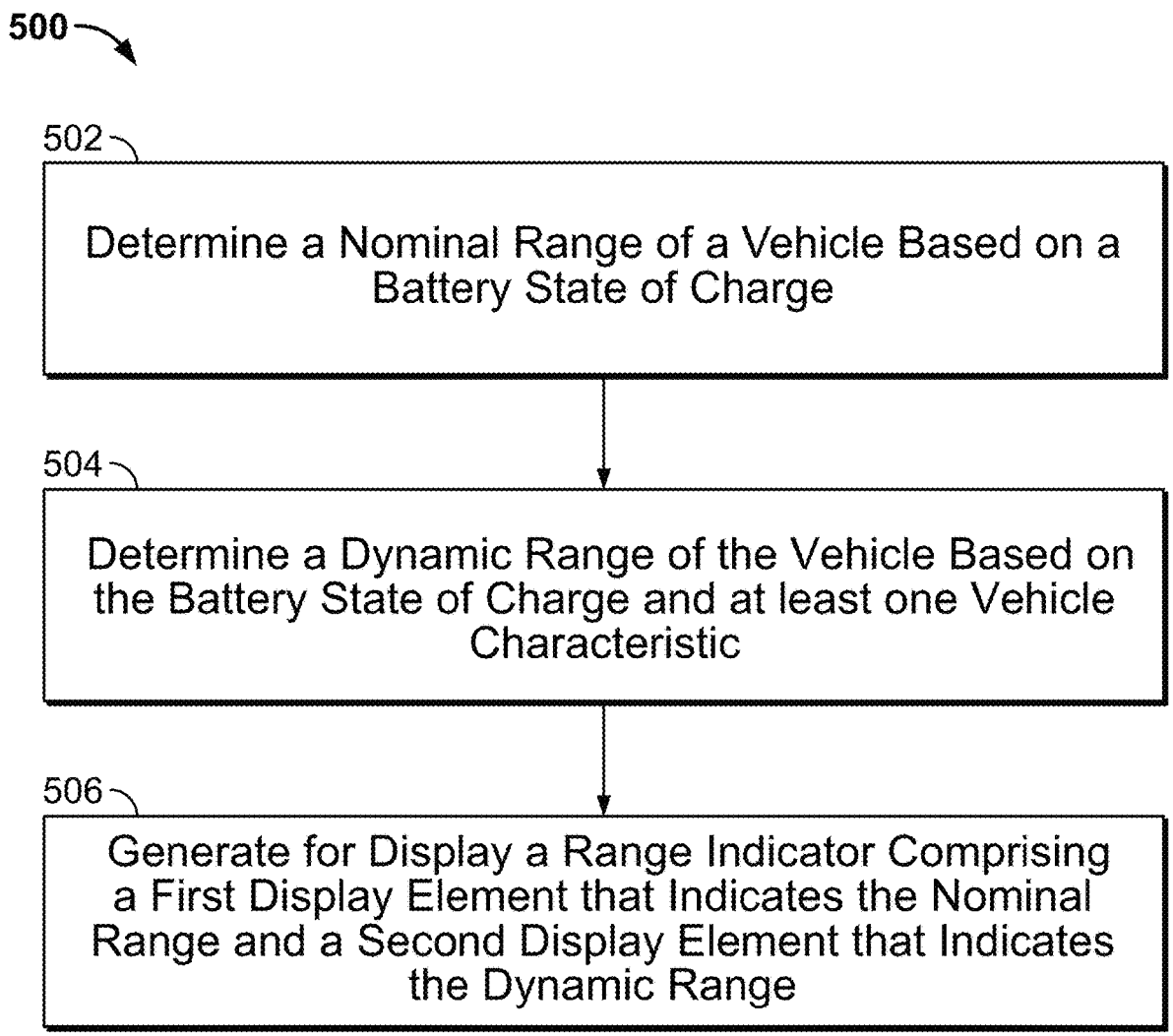
FIG. 5 shows an illustrative flowchart depicting an exemplary process for displaying range, in accordance with an embodiment of the present disclosure.

FIG. 5 shows an illustrative flowchart depicting an exemplary process for displaying range, in accordance with an embodiment of the present disclosure. The process 500 may be executed by control circuitry 304 of FIG. 3—located in vehicle device 300. It will be understood that process 500, and any step thereof, may be altered to any suitable configuration, including modifications to any of the steps themselves.

The process 500 begins at step 502, where control circuitry 304 determines a nominal range of a vehicle based on a battery state of charge. The nominal range of the vehicle reflects the nominal condition, which in some embodiments represents a vehicle state where ideal travel conditions are met to maximize vehicle range. The nominal range may represent a flat route, normal tires, optimal ride height, nominal outside temperature, a rolling average of driving efficiency over a time period (e.g., miles-per-energy notation), etc. and does not change with drive modes, vehicle configurations (e.g., type of tires or any suitable load on the vehicle), route features, or driving behavior. For example, the nominal range may not consider low tire pressure when determining the vehicle's range. In another example, if a driver's behavior were to change so that the vehicle travelled at high speeds, with high accelerations, and with limited regeneration, the nominal range may not consider such erratic driving characteristics in determining the vehicle's range. It will be understood that the nominal range may be any suitable value. In some embodiments, the nominal range corresponds to a first display element, which indicates the vehicle's nominal range via a first bar length (e.g., of a faded color).

The process 500 proceeds to step 504, where control circuitry 304 determines a dynamic range of the vehicle based on the battery state of charge and one or more vehicle characteristics. In some embodiments, vehicle characteristics may include drive mode, drive height, driving efficiency (e.g., driving behavior or characteristics), route features, battery state of charge (e.g., battery state of energy or battery state of health), vehicle configuration (e.g., type of tires, any suitable load on the vehicle, permanent body adjustments, etc.), and HVAC (heating, ventilation, and air conditioning)/climate controls. In some embodiments, vehicle characteristics may include any suitable vehicle characteristic (e.g., range factor) or external variable that may affect the vehicle's dynamic range. For example, having the air conditioning system operating at full capacity may reduce the vehicle's range from a nominal range value of, e.g., 280 miles, to a dynamic range value of, e.g., 260 miles. In another example, towing a 3,500-pound travel trailer for a camping trip may reduce the vehicle's range from a nominal range value of, e.g., 280 miles, to a dynamic range value of, e.g., 200 miles. It will be understood that the dynamic range may be any suitable value. In some embodiments, the dynamic range may exceed the nominal range. In some embodiments, the dynamic range corresponds to a second display element, which indicates the vehicle's dynamic range via a second bar length (e.g., of a full color).

The process 500 proceeds to step 506, where control circuitry 304 generates for display a range indicator comprising a first display element that indicates the nominal range and a second display element that indicates the dynamic range. As described above, the range indicator, or dynamic range indicator, includes a first display element, which indicates the vehicle's nominal range, and a second display element, which indicates the vehicle's dynamic range. In some embodiments, the first display element is a first bar length and the second display element is a second bar length. The first bar length, corresponding to the nominal range, is a faded color and the second bar length, corresponding to the dynamic range, is a full color. For example, a vehicle may travel a route with a significant increase in elevation, which may reduce the vehicle's range from a nominal range value of, e.g., 240 miles, to a dynamic range value of, e.g., 180 miles due to the uphill nature of the drive. The range indicator may reflect this uphill route with a first bar length of a faded color, corresponding to the vehicle's nominal range, extending the full length of the battery icon and a second bar length of a full color, corresponding to the vehicle's dynamic range, extending three fourths the length of the battery icon. In some embodiments, the second bar length may exceed the first bar length. For example, a route with a decrease in elevation may result in a nominal range value, indicated by the first bar length of the faded color, of 80 miles and a dynamic range value, indicated by the second bar length of the full color, of 100 or more miles. In some embodiments, the range indicator may include more than two display elements, which may indicate more than two ranges a vehicle is capable of travelling based on battery state of charge and vehicle characteristic(s). In some embodiments, control circuitry 304 may determine a vehicle characteristic(s) (e.g., driving efficiency, route features, drive mode, vehicle configurations, etc.) that causes the dynamic range to be different than the nominal range and may generate for display information indicating the vehicle characteristic(s) and its impact on the dynamic range. In some embodiments, the range indicator may receive a selection via user input interface 310, in which case control circuitry 304 may generate for display, in response to the selection, an exploded version of the range indicator with visual information indicating a particular vehicle characteristic(s) and its impact on the dynamic range (e.g., as shown in FIG. 4).

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A method for displaying a range associated with a vehicle, comprising:
   determining, using processing circuitry, a first range of the vehicle based on a battery state of charge;
   generating for display, using the processing circuitry, a range indicator on a display of the vehicle, wherein the range indicator comprises a first display element that indicates the first range and a second display element that indicates a dynamic range, wherein the second display element is shown concurrently with the first display element on the display of the vehicle;
   detecting, based on one or more sensors of the vehicle, while the vehicle is traveling, a change in a vehicle characteristic that causes the dynamic range to be less than the first range of the vehicle;
   determining, by the processing circuitry and jointly using a machine learning model and a value from the one or more sensors of the vehicle, an impact of the change in the vehicle characteristic on the dynamic range;
   adjusting, using the processing circuitry, the dynamic range of the vehicle based on the determined impact of the change in the vehicle characteristic determined at least in part based on the machine learning model, battery state of charge and the vehicle characteristic; and
   controlling, using the processing circuitry, the display of the range indicator by adjusting the displayed-second display element based on the adjusted dynamic range while the vehicle is traveling, wherein the second display element is shown concurrently with the first display element on the display of the vehicle.

2. The method of claim 1, further comprising:
   determining the vehicle characteristic that causes the adjusted dynamic range to be less than the first range; and
   generating for display information indicating the vehicle characteristic and the impact of the vehicle characteristic on the dynamic range.

3. The method of claim 2, further comprising:
   receiving a selection of the range indicator; and
   generating for display, in response to the selection, information indicating the vehicle characteristic and the impact of the vehicle characteristic on the adjusted dynamic range.

4. The method of claim 1, wherein the range indicator comprises a linear icon, wherein the first display element comprises a first bar length corresponding to the first nominal range, and wherein the second display element comprises a second bar length corresponding to the adjusted dynamic range.

5. The method of claim 4, wherein the first bar length comprises a first color or shade and the second bar length comprises a second color or shade discernible from the first color or shade.

6. The method of claim 1, further comprising generating for display a numerical value corresponding to the adjusted dynamic range.

7. The method of claim 1, wherein the vehicle characteristic is a first vehicle characteristic further comprising:
   determining by the processing circuitry and jointly using the machine learning model, a change in a second vehicle characteristic that increases the adjusted dynamic range of the vehicle; and
   generating for display a recommendation to increase the adjusted dynamic range of the vehicle, wherein the recommendation comprises the change in the second vehicle characteristic.

8. The method of claim 1, wherein the adjusted dynamic range is determined from a group of vehicle characteristics comprising driving efficiency, route traits, drive mode, battery state of charge, and vehicle configuration.

9. The method of claim 1, further comprising determining a driving characteristic of a user, wherein the vehicle characteristic comprises the driving characteristic.

10. The method of claim 1, further comprising:
receiving a destination; and
determining route information to the destination, wherein the vehicle characteristic comprises the route information.

11. The method of claim 1, further comprising communicating the adjusted dynamic range from the vehicle to a mobile device.

12. A range indicator system associated with a vehicle, comprising:
one or more sensors;
a display; and
processing circuitry configured to:
determine a first range of the vehicle based on a battery state of charge;
generate for display on the display, using the processing circuitry, a range indicator, wherein the range indicator comprises a first display element that indicates the first range and a second display element that indicates a dynamic range, wherein the second display element is shown concurringly with the first display element on the display of the vehicle;
detect, based on a signal from the one or more sensors of the vehicle, while the vehicle is traveling, a change in a vehicle characteristic that causes the dynamic range to be less than the first range of the vehicle;
determine, jointly using a machine learning model and a value from the one or more sensors of the vehicle, an impact of the change in the vehicle characteristic on the dynamic range;
adjust using the processing circuitry, the dynamic range of the vehicle based on the determined impact of the change in the vehicle characteristic determined at least in part based on the machine learning model, battery state of charge, and the vehicle characteristic; and
control, using the processing circuitry, the display of the range indicator by adjusting the displayed-second display element based on the adjusted dynamic range while the vehicle is traveling, wherein the second display element is shown concurrently with the first display element on the display of the vehicle.

13. The range indicator system of claim 12, wherein the processing circuitry is further configured to:
determine the vehicle characteristic that causes the adjusted dynamic range to be less different than the first nominal range; and
generate for display information indicating the vehicle characteristic and an impact of the vehicle characteristic on the adjusted dynamic range.

14. The range indicator system of claim 12, wherein the vehicle characteristic is a first vehicle characteristic, and wherein the processing circuitry is further configured to:
determine, jointly using the machine learning model, a change in a second vehicle characteristic that increases the adjusted dynamic range of the vehicle; and
generate for display a recommendation to increase the adjusted dynamic range of the vehicle, wherein the recommendation comprises the change in the second vehicle characteristic.

15. The range indicator system of claim 12, wherein the range indicator comprises a linear icon, wherein the first display element comprises a first bar length corresponding to the first nominal range, and wherein the second display element comprises a second bar length corresponding to the adjusted dynamic range.

16. The range indicator system of claim 15, wherein the first bar length comprises a first color or shade and the second bar length comprises a second color or shade discernible from the first color or shade.

17. The range indicator system of claim 12, wherein the display is further configured to display a numerical value corresponding to the adjusted dynamic range.

18. The range indicator system of claim 12, wherein the processing circuitry is further configured to:
receive a selection of the range indicator; and
cause, in response to the selection, information indicating the vehicle characteristic and an impact of the vehicle characteristic on the adjusted dynamic range to be displayed on the display.

19. A non-transitory computer-readable medium having non-transitory computer-readable instructions encoded thereon that, when executed by processing circuitry, causes the processing circuitry to:
determine a first nominal range of a vehicle based on a battery state of charge;
generate a range indicator on a display of the vehicle, wherein the range indicator comprises a first display element that indicates the first range and a second display element that indicates a dynamic range, wherein the second display element is shown concurrently with the first display element on the display of the vehicle;
detect, based on one or more sensors of the vehicle, while the vehicle is traveling, a change in a vehicle characteristic that causes the dynamic range to be less than the first range of the vehicle;
determine jointly using a machine learning model and a value from the one or more sensors of the vehicle, an impact of the change in the vehicle characteristic on the dynamic range of the vehicle based on the battery state of charge and the vehicle characteristic;
adjust, using the processing circuitry, the dynamic range of the vehicle based on the determined impact of the change in the vehicle characteristic determined at least in part based on the machine learning model, battery state of charge and the vehicle characteristic; and
control, using the processing circuitry, the display of the range indicator by adjusting the displayed-second display element based on the adjusted dynamic range while the vehicle is traveling, wherein the second display element is shown concurrently with the first display element on the display of the vehicle.

* * * * *